United States Patent [19]
Watanabe et al.

[11] Patent Number: 5,679,889
[45] Date of Patent: Oct. 21, 1997

[54] METHOD FOR EXTRACTING ELECTRODE AND CANTILEVER FOR AFM USING SAID METHOD FOR EXTRACTING ELECTRODE

[75] Inventors: Shunji Watanabe, Tokyo; Tetsuo Hattori, Yokohama, both of Japan

[73] Assignee: Nikon Corporation, Tokyo, Japan

[21] Appl. No.: 597,599

[22] Filed: Feb. 6, 1996

[30] Foreign Application Priority Data

Feb. 6, 1995 [JP] Japan ................................ 7-018253
Dec. 6, 1995 [JP] Japan ................................ 7-317629

[51] Int. Cl.⁶ ............................ G01B 5/28; G01N 23/00
[52] U.S. Cl. ................................................. 73/105
[58] Field of Search ........................ 73/105; 250/306, 250/307

[56] References Cited

U.S. PATENT DOCUMENTS

5,268,571 12/1993 Yamamoto et al. ................ 250/306
5,276,672 1/1994 Miyazaki et al. ................... 73/105 R
5,537,863 7/1996 Fujiu et al. ........................... 73/105
5,546,375 8/1996 Shimada et al. ................. 250/306 X Primary Examiner—Hezron E. Williams
Assistant Examiner—Daniel S. Larkin
Attorney, Agent, or Firm—Shapiro and Shapiro

[57] ABSTRACT

A method for extracting electrodes, comprises the steps of forming an electrode of a dielectric thin film on a first substrate member, forming a small projection on a second substrate member, forming a wiring pattern of an electrode extracting member communicating with the projection on the second substrate member, whereby the electrode extracting member on the projection constitutes a projection portion and the electrode of the first substrate member is brought into contact with the projection portion to the electrode extracting member on the second substrate member, whereby the electrode can be electrically connected to an external unit via the electrode extracting member.

7 Claims, 7 Drawing Sheets

METHOD FOR EXTRACTING ELECTRODE AND CANTILEVER FOR AFM USING SAID METHOD FOR EXTRACTING ELECTRODE

BACKGROUND OF THE INVENTION

1. Field of the Invention

The present invention relates to a technology for taking out (extracting) an upper electrode and a lower electrode of dielectric thin film, and particularly, to a method for taking out an upper electrode and a lower electrode of a cantilever for an atomic force microscope (AFM) with a piezoelectric displacement sensor.

2. Related Background Art

An outline of a conventional method for taking out an upper electrode and a lower electrode of dielectric thin film will be described below in the order of the steps shown in FIGS. 1A to 1F.

Figure 1A:
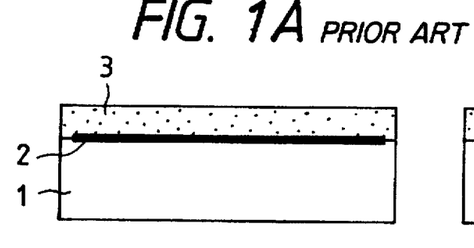
FIGS. 1A to 1F are views for illustrating a conventional method for taking out electrodes of a dielectric film.
Figure 1B:
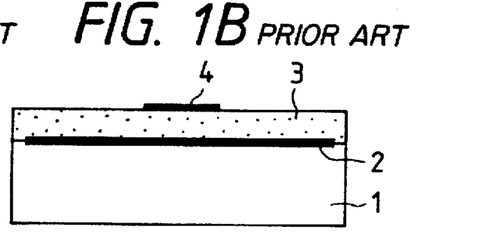
Figure 1C:
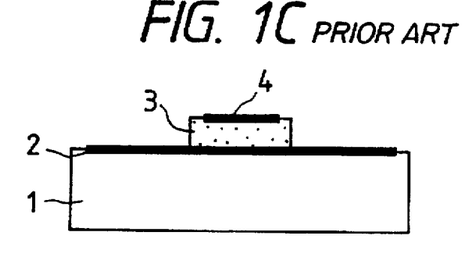
Figure 1D:
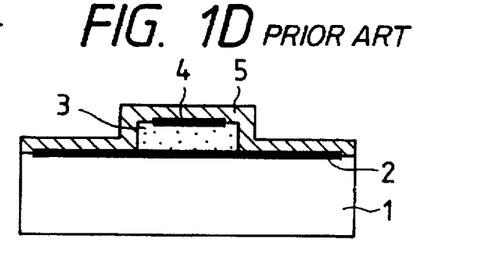
Figure 1E:
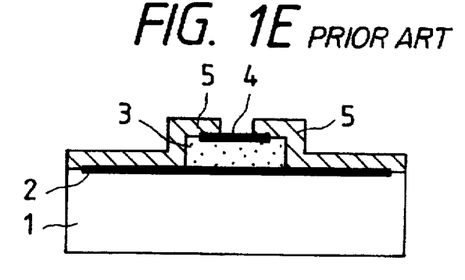
Figure 1F:
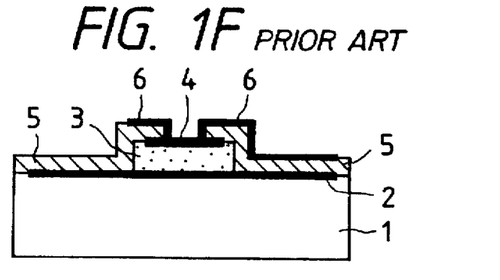

As shown in FIG. 1A, a lower electrode film 2 is formed on a substrate 1 to serve as a ground, and a dielectric film 3 is formed on the lower electrode film 2 over the entire substrate 1. An upper electrode 4 is formed on the dielectric film 3 to conduct patterning, as shown in FIG. 1B. As shown in FIG. 1C, the dielectric film 3 is subjected to etching. As shown in FIG. 1D, an insulating film 5 is formed over the entire surface of the substrate 1 by a film forming method such as a low pressure CVD. As shown in FIG. 1E, a portion above the upper electrode 4 of the insulating film 5 is subjected to the etching. Then, a wiring pattern 6 for taking out a signal concerning the dielectric film 3 is prepared, as shown in FIG. 1F.

As described above, in addition to the film formation of the lower electrode the steps of forming, the dielectric film forming, the upper electrode on the substrate, preparation of the insulating film, etching of the insulating film, and preparation of the wiring pattern are conducted. Thus, a plurality of electronic devices can be patterned on the substrate and separated from one another as chips so that the electronic devices can be mass-produced.

The conventional method for taking out an upper electrode and a lower electrode of dielectric thin film requires steps for etching the dielectric film, preparing the insulating film, etching the insulating film, and preparing the wiring pattern, in addition to the film formation for the lower electrode, the dielectric film, and the upper electrode. As a result, the manufacturing process becomes unavoidably complicated. Also, since these steps are conducted on the same substrate, a yield may be lowered. In either case, the production cost is increased.

However, the most serious problem of the conventional method for taking out the upper and lower electrodes of the dielectric thin film is that forming conditions can not be established for some kinds of dielectric films. For example, a piezoelectric substance of a lead group which has a high piezoelectric constant is used as a dielectric film of a cantilever for an AFM with a piezoelectric film displacement sensor. When this lead-group piezoelectric film is used, the electric properties thereof after film formation of the piezoelectric film cannot be maintained if the conventional method for taking out the upper and lower electrodes is employed. After the preparing steps are completed, the electric properties are unavoidably deteriorated.

SUMMARY OF THE INVENTION

An object of the present invention is to eliminate these drawbacks of the conventional method by providing a method for taking out an upper electrode and a lower electrode of dielectric film.

Extensive studies were made concerning the post-processes other than the formation of the upper electrode film, the dielectric film, and the lower electrode film on the substrate, including etching of the dielectric film after the film formation, preparation of the insulating film, etching of the insulating film, etc. However, the process which causes deterioration in the electric properties of the dielectric film could not be determined in spite of repeated experiments. As a result, the problems could not be solved.

Accordingly, the present inventors paid special attention to the fact that the post-processes including the etching of the dielectric film after the film formation, the film formation of the insulating film, the etching of the insulating film, etc., are conducted in order to take out a signal of the dielectric film, and considered that the problems may be solved by not conducting these processes on the same substrate, but by forming a wiring pattern for taking out the signal on another substrate. In this manner, both substrates can be made electrically communicating to each other by bonding, etc., in such a manner to avoid deterioration in the electric properties of the dielectric film.

The present invention provides a method for taking out an electrode of dielectric thin film formed on a first substrate member, which comprises the steps of:

preparing an electrode extracting member having a small projection and a wiring pattern communicating with said projection formed on a second substrate; and causing the electrode on said first substrate to contact or connect said projection of said electrode extracting member so as to take out the electrode by way of of the wiring pattern of the electrode extracting member.

The present invention also provides a method for taking out an electrode, characterized in that said first substrate is a cantilever for an atomic force microscope with a piezoelectric film displacement sensor, and the dielectric thin film is a piezoelectric thin film formed on said cantilever.

The present invention also provides a method for taking out an electrode, characterized in that a metal which is liquid at a normal temperature is inserted between the electrode of said first substrate and the projection of said electrode extracting member so as to connect said first substrate to said electrode extracting member.

The present invention also provides a method for taking out an electrode, characterized in that said metal which is liquid at the normal temperature is an alloy of a gallium-indium group.

The present invention also provides a cantilever for an atomic force microscope with a piezoelectric film displacement sensor wherein an upper electrode and a lower electrode of a dielectric thin film formed on a first substrate member are taken out, characterized in that:

an electrode extracting member containing a small projection and a wiring pattern communicating with said projection are formed on a second substrate; and an electrode of said first substrate is contacted or connected to said projection of said electrode extracting member so as to take out the electrode by way of the wiring pattern of the electrode extracting member.

The present invention provides a cantilever for an atomic force microscope with a piezoelectric film displacement sensor, which is characterized in that said first substrate is a cantilever for an atomic force microscope with a piezoelectric film displacement sensor, and the dielectric thin film is a piezoelectric thin film formed on said cantilever.

The present invention also provides a cantilever for an atomic force microscope with a piezoelectric film displacement sensor which is characterized in that a metal which is liquid at a normal temperature is inserted between the electrode of said first substrate and the projection of said electrode extracting member so as to connect said first substrate to said electrode extracting member.

The present invention also provides a cantilever for an atomic force microscope with a piezoelectric film displacement sensor, which is characterized in that said metal which is liquid at the normal temperature is an alloy of a gallium-indium group.

The present invention also provides a method for taking out an electrode, characterized in that:

a metal which is liquid at a normal temperature or a conductive paste is coated on a part of an upper electrode and a part of a lower electrode of dielectric thin film formed on a first substrate member; and a second substrate member with a wiring pattern of an electrode extracting member formed thereon is connected to said metal which is liquid at the normal temperature or conductive paste to take out the electrodes.

The present invention also provides a cantilever for an atomic force microscope with a piezoelectric film displacement sensor comprising:

a first substrate member on which an upper electrode and a lower electrode of a dielectric thin film are formed;

a metal which is liquid at the normal temperature or a conductive paste formed on a part of said upper electrode and a part of said lower electrode; and a second substrate member on which a wiring pattern of an electrode extracting member connected to said metal which is liquid at the normal temperature or said conductive paste is formed.

When the upper and lower electrodes of the dielectric thin film are taken out, an electrode extracting substrate (second substrate) on which a small projection portion for communication and a wiring pattern communicating with said projection portion are present is prepared separately, the upper and lower electrodes and the projection portion for communication of the second substrate are aligned with each other so as to be brought into contact and fixedly bonded to ensure the electric communication, whereby it is possible to communicate the upper and lower electrodes of the dielectric thin film with the wiring pattern of the second substrate and it is also possible to eliminate the causes of deterioration in the properties of a dielectric film according to the conventional method.

When the upper and lower electrodes and the communicating projection portion of the second substrate are aligned with each other so as to be brought into contact and bonded, a liquid metal of a gallium-indium group may be inserted between the upper and lower electrodes and the communicating projection portion of the second substrate in order to ensure the electric contact.

When the upper and lower electrodes of the dielectric thin film are taken out, another substrate (second substrate) for taking out electrodes having a wiring pattern of an electrode extracting member is separately prepared, a liquid at a normal temperature or a conductive paste is coated on a part of said upper electrode and a part of said lower electrode, these parts and said electrode extracting member are aligned with each other to be brought into contact, and they are bonded and fixed to ensure the electric communication, whereby it becomes possible to communicate the upper and lower electrodes of the dielectric thin film with the wiring pattern of the electrode extracting member of the second substrate and to eliminate the causes of deterioration in the electric properties of the dielectric film according to the conventional method.

The liquid or a conductive paste at the normal temperature can be an alloy of a gallium-indium group.

By employing the present invention, the processes such as the etching of a dielectric film, the film formation of an insulating film, the etching of said insulating film, etc., become no longer required, and it is possible to avoid deterioration in the electric properties of said dielectric film caused by the employment of these post-processes.

The present invention is especially effective in cases where the forms of the electronic devices are especially difficult to be processed and the processing for taking out the upper and lower electrodes of the dielectric film has to be conducted after the formation of a cantilever or where the like has been finished, or the upper and lower electrodes of the dielectric film of a cantilever for an AFM with a piezoelectric film displacement sensor using a film of a ferroelectric substance of a lead Group for which it is difficult to maintain the electric properties are to be taken out.

It is noted that the present invention is not limited to the cases in which the upper and lower electrodes of the dielectric film are taken out, but can be applied when upper and lower electrodes of a metallic film for resistance or a semiconductor film are taken out.

DESCRIPTION OF THE PREFERRED EMBODIMENTS

FIGS. 2A to 2D show a first embodiment of the method for taking out upper and lower electrodes according to the present invention. Before explaining the present invention with reference to FIGS. 2A to 2D, a method for preparing a cantilever for an AFM with a piezoelectric film displacement sensor will be described with reference to FIGS. 3A to 3O. It is noted that the upper parts in FIGS. 3B to 3O are views for showing each of the steps seen from the top, while the lower parts are cross-sectional views seen from the lateral sides thereof. However, the positional relationship is reversed with respect to FIGS. 3F and 3G since FIGS. 3F and 3G are used for describing the bottom surface.

Silicon nitride ($Si_3N_4$) films 20 and 21 are formed to have a film thickness of 100 nm by CVD on both sides of a silicon monocrystal wafer ($Si_{(100)}$ ϕ3"×′0.38 wafer) 10 having an azimuth of (100). Forty-six rectangular pieces illustrated on the wafer 10 in FIG. 3A indicate temporary positions for preparing a cantilever from these portions. A dicing saw is used to cut along these solid lines to form cantilever chips. The preparing method will be described below by using one chip on the wafer 10.

FIG. 3B is a view for showing a method for preparing a resist pattern of a probe.

Figure 3A:
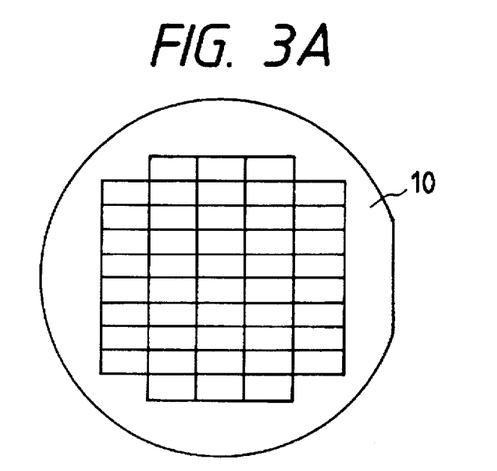
FIGS. 3A to 3O are views for illustrating a process of preparing a cantilever used in the first embodiment.
Figure 3B:
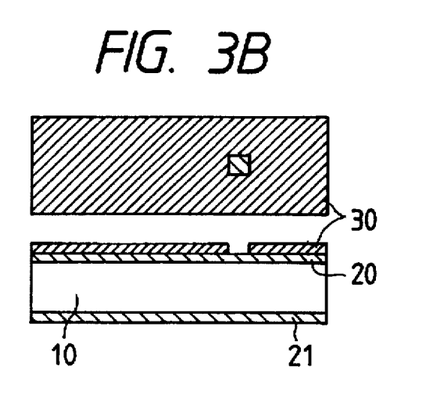
Figure 3C:
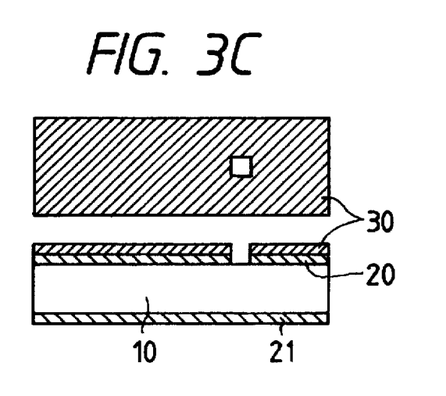
Figure 3D:
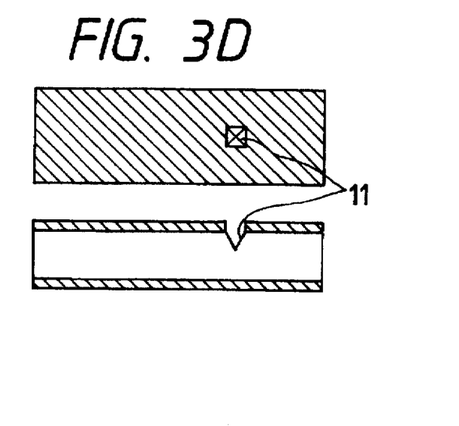
Figure 3E:
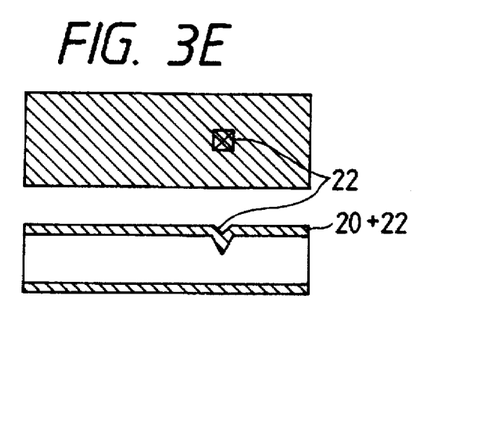

First, a photoresist 30 is coated on the entire surface of the wafer 10 and the photoresist on a position for preparing the probe is removed by photolithography (FIG. 3B). Next, the silicon nitride film 20 in a portion having no photoresist is removed by reactive ion etching (RIE) (FIG. 3C). Next anisotropic etching is conducted in solution of potassium hydroxide (KOH); the etching forms a pit 11 at the portion having no silicon nitride film 20 (which serves as a protective film against the etching) Next, the photoresist 30 is peeled off (FIG. 3D). The silicon nitride ($Si_3N_4$) film 22 serving as the probe is formed over the pit 11 to have a film thickness of 400 nm by CVD (FIG. 3E).

FIG. 3F is a view for showing a method for preparing a resist pattern for back-etching.

Figure 3F:
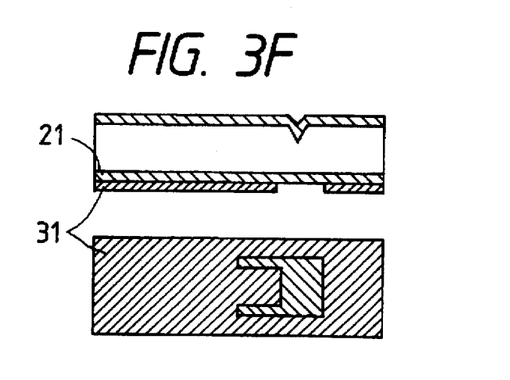
Figure 3G:
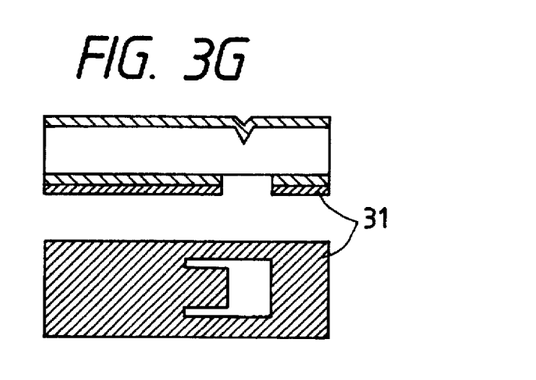
Figure 3H:
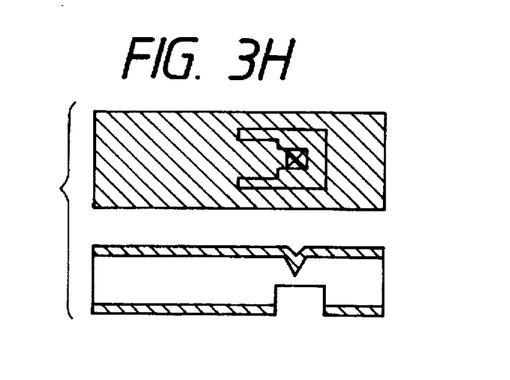

With respect to the back surface of the above-mentioned wafer, photoresist 31 for the back-etching is applied onto the entire surface of the silicon nitride film 21, and the photoresist on a portion for constituting a void which is required for forming a cantilever is removed by the photolithography (FIG. 3F). In the same manner as earlier described, the silicon nitride film 21 in a predetermined form on the back surface is removed by RIE (FIG. 3G). Further, the silicon back surface is subjected to anisotropic etching in the KOH solution. Next, the photoresist 31 is peeled off (FIG. 3H).

Figure 3I:
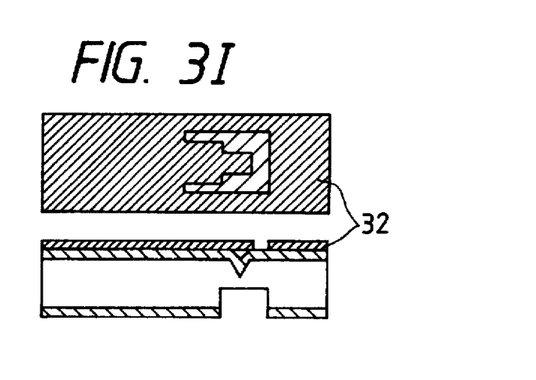

FIG. 3I is a view for showing a method for preparing a resist pattern of a lever portion.

Figure 3J:
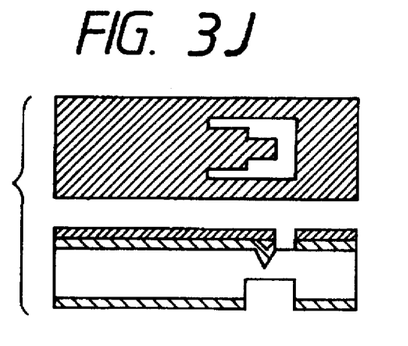
Figure 3K:
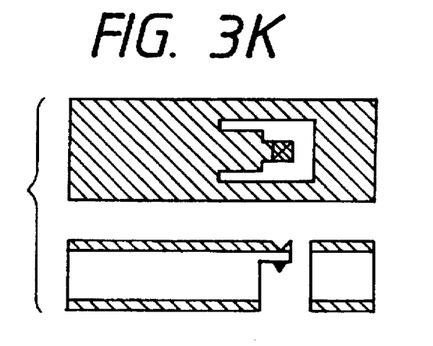

Returning to the preparing process of the upper surface of the wafer, photoresist 32 is applied onto the upper surface of the wafer, and then, a pattern of the lever portion is prepared by photolithography (FIG. 3I). Next, the silicon nitride film in a predetermined form on the upper surface is removed by RIE (FIG. 3J). Further, the silicon is subjected to anisotropic etching in the KOH solution, thereby forming the lever portion (FIG. 3K).

Figure 3L:
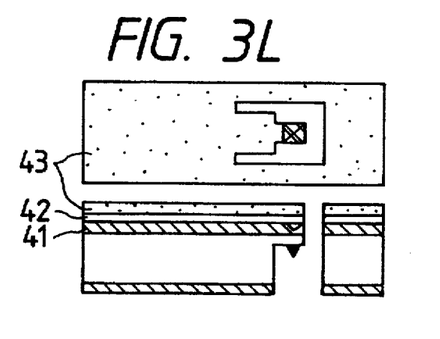
Figure 3M:
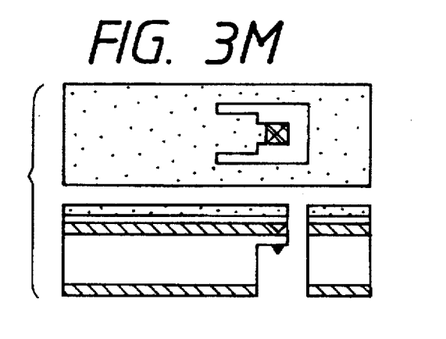
Figure 3N:
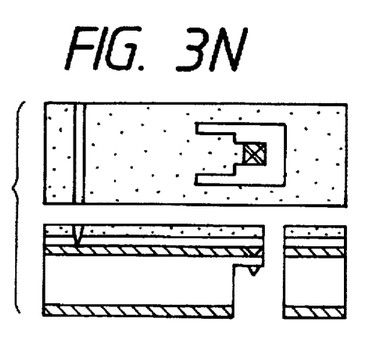

The previous steps were for forming a shape of the cantilever. In the following, a film forming process for an upper electrode, a lower electrode and a piezoelectric film will be described below in order. As shown in FIG. 3L, a tantalum (Ta) film 41 having a thickness of 10 nm, a platinum (Pt) film 42 of 200 nm, a titanic acid zirconia acid lead (PZT) film 43 of 0.8 μm serving as a piezoelectric film are formed on the entire surface of the wafer by sputtering. The Pt film becomes a lower electrode, and the Ta film improves the sticking condition between the Pt film and the silicon nitride film and serves to prevent diffusion of atoms when the annealing process is conducted in the next step shown in FIG. 3M (FIG. 3L). Next, in order to draw forth the piezoelectric properties of the PZT film, the annealing process (at 650° C. for 30 minutes) is conducted (FIG. 3M). In order to extract the lower electrode, a part of the surface is scraped by a diamond pen to expose the lower electrode (FIG. 3N). Aluminum is mask-evaporated on the lower electrode and the lever portion in the pre-process, so as to obtain the electrodes 50 and 51 as the upper electrode and the lower electrode, respectively (FIG. 3O).

Returning to FIGS. 2A to 2D, description will be made on a method for preparing the second substrate for extracting electrodes according to the present invention and the connection between the first substrate and the second substrate. It is noted that the upper parts in FIGS. 2A to 2D are views for showing each of the steps seen from the top, while the lower parts are cross-sectional views seen from the side faces thereof.

Figure 2A:
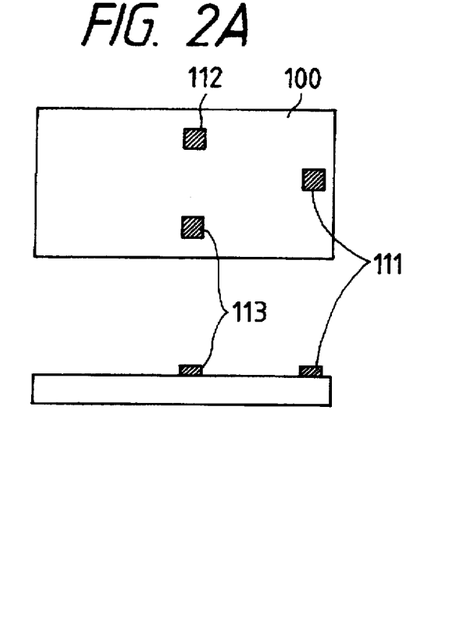
FIGS. 2A to 2D are views for illustrating a process of preparing an electrode extracting substrate and a method for extracting electrodes of a piezoelectric film according to a first embodiment of the present invention.
Figure 2B:
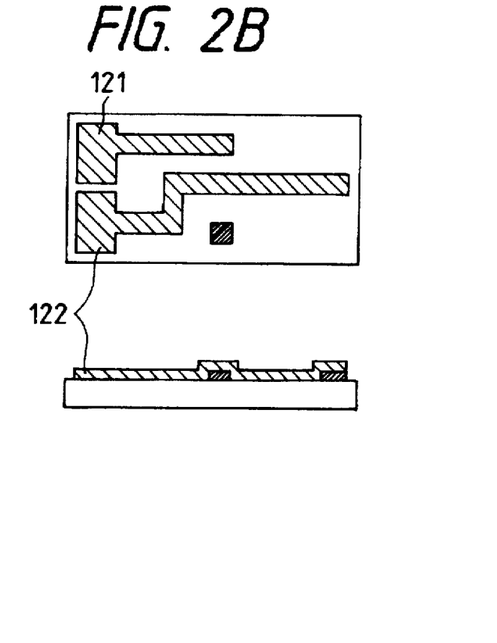
Figure 2C:
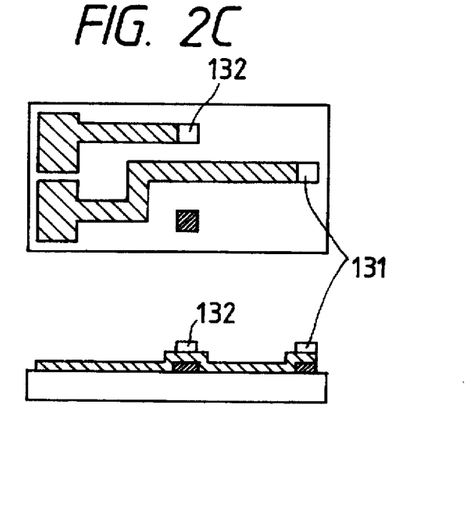
Figure 3O:
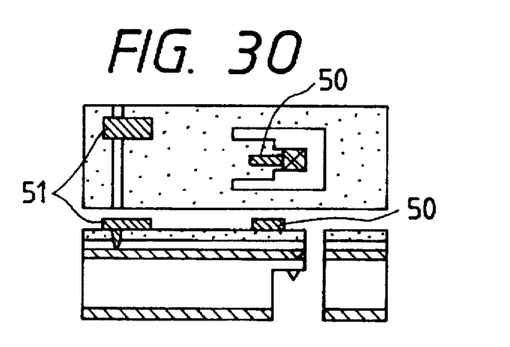

As shown in FIG. 2A, three silver paste projections 111, 112 and 113 are formed on a rectangular floating glass substrate 100 by screen printing. Out of these projections, the two projections 111 and 112 are subjected to the screen printing at positions corresponding to the locations of the upper electrode 50 of the cantilever and the lower electrode 51 when the two substrates are bonded together (FIG. 2A). Next, extracting electrodes 121 and 122 are prepared from the two projections 111 and 112 by patterning aluminum (Al) by using a metal mask by vacuum evaporation. The remaining one projection 113 is used as a dummy for determining when the upper and lower electrodes and the extracting electrodes are bonded together (FIG. 2B). Next, as shown in FIG. 2C, Ga—In alloys 131 and 132 are screen-printed onto the first two projections for communication. Since these alloys are liquid, this process is feasible. Also, when these alloys are bonded to the cantilever, the electric communication between each of the upper and lower electrodes of the cantilever and the corresponding extracting electrode on the second substrate can be ensured (FIG. 2C).

Figure 2D:
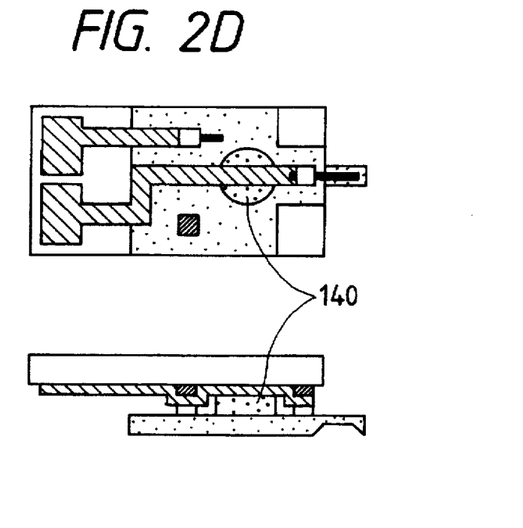

Finally, after the upper and lower electrodes of the AFM cantilever having a piezoelectric thin film and the communicating projections on the second substrate are aligned with each other, they are bonded together by using an adhesive 140. In FIG. 2D, a chip of the rectangular cantilever has been cut from the silicon monocrystal wafer by a dicing saw and an outer frame for protecting a leading edge of the cantilever has been already removed. However, a cantilever with the outer frame may be used as well. In that case, the outer frame for protection can be removed after the bonding (FIG. 2D).

By the above-mentioned preparing method, a cantilever for the AFM which has a piezoelectric film displacement sensor and an improved yield can be obtained so that the upper and lower electrodes can be extracted without deterioration in the electric properties of the PZT film.

FIGS. 4A to 4D illustrate a second embodiment using a method for preparing the second substrate for extracting the electrodes of a cantilever for an AFM with a piezoelectric film displacement sensor which is different from that of the first embodiment. However, the cantilever itself is the same as that prepared in the first embodiment.

Figure 4A:
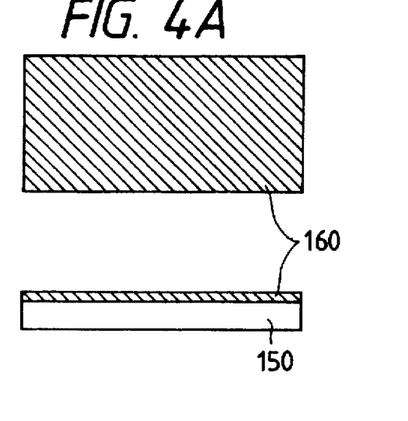
FIGS. 4A to 4D are views for illustrating a process of preparing a cantilever used in a second embodiment of the present invention.
Figure 4B:
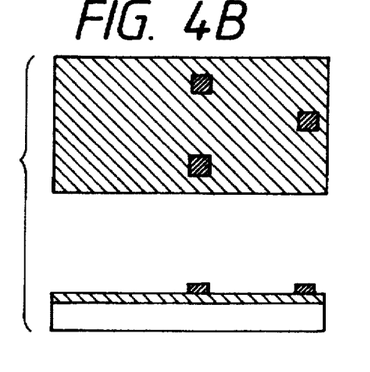
Figure 4C:
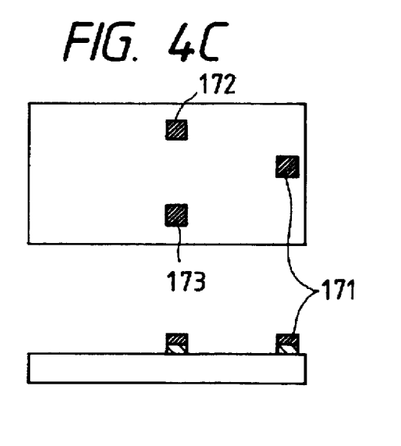
Figure 4D:
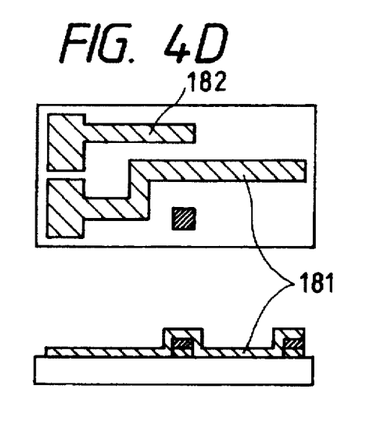
Figure 5:
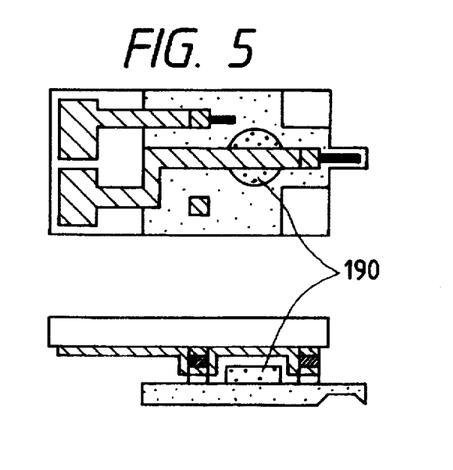
FIG. 5 is a view for illustrating a process of preparing an electrode extracting substrate and a method for extracting electrodes of a piezoelectric film according to the second embodiment of the present invention.

Cr film 160 is formed by the vacuum evaporation on an entire surface of a glass substrate 150 to have a film thickness of 50 nm (FIG. 4A). Next, projections are prepared with photoresist patterns at the same three positions as those in the first embodiment (FIG. 4B). The Cr film other than the photoresist is removed by acid so as to form projections 171, 172 and 173 (FIG. 4C). In the same manner as in the first embodiment, aluminum electrodes 181 and 182 for extracting the electrodes of the piezoelectric film are prepared by the mask evaporation from the two projections 171 and 172 out of the above three projections (FIG. 4D). The second substrate is prepared in the above-mentioned process. This second substrate is bonded to the upper and lower electrodes of dielectric thin film of the cantilever by an epoxy adhesive 190, as shown in FIG. 5, in such a manner that the corresponding projections contact each other.

As stated in the above-mentioned embodiments, according to the present invention, the electrodes of the cantilever with the piezoelectric film can be taken out. Moreover, if the electrodes are taken out by the electrodes prepared on the second substrate, the piezoelectric film is not deteriorated, unlike by the conventional electrode extracting method so as to provide a superior cantilever for an AFM with a piezoelectric film displacement sensor.

Also, in the present embodiment, a metal mask is used in the method for preparing the extracting electrode. However, a method for preparing an electrode is not limited to this method. Normal lithography may also be employed. It is also possible to employ a method of exposing the lower electrode on the first substrate by scraping or using lithography.

Figure 6A:
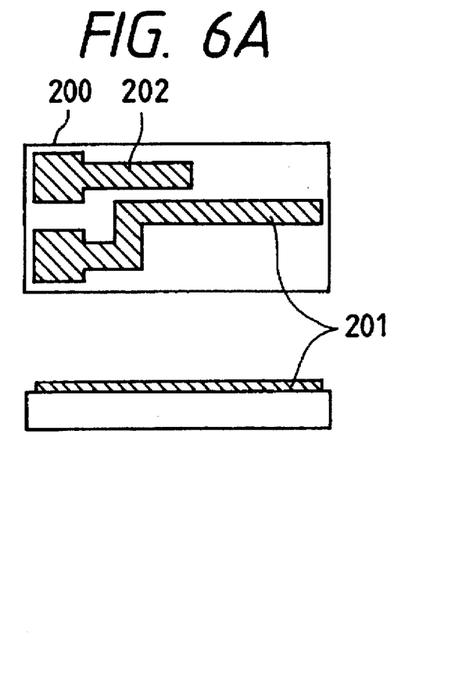
FIGS. 6A to 6C are views for illustrating a process of preparing an electrode extracting substrate and a method for extracting electrodes of a piezoelectric film according to a third embodiment of the present invention.
Figure 6B:
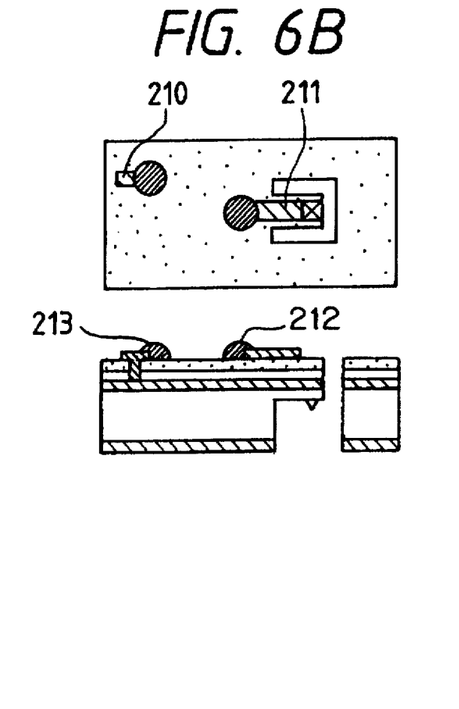
Figure 6C:
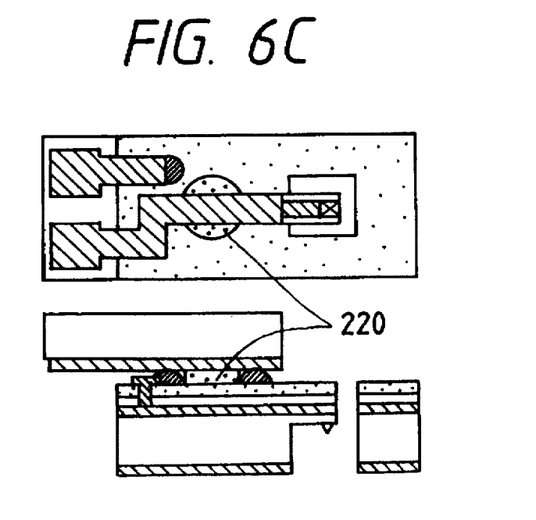

FIGS. 6A–6C show a third embodiment. Referring to FIG. 6A, on a surface of the glass substrate 200, chrome with a thickness of 100 nm and gold of 100 nm are pattern-evaporated successively with metal mask by using vacuum evaporation so as to form an extracting electrode 201 and an extracting electrode 202 for the upper and lower electrodes, respectively.

Next, as shown in FIG. 6B, Ga—In alloys 212 and 213 are applied by a dispenser to an upper electrode 211 and a lower electrode 210 of a cantilever which is prepared by the same method as that in the first embodiment.

As shown in FIG. 6C, the upper electrode extracting electrode 201 and the lower electrode extracting electrode 202 are aligned with the Ga—In alloys 212 and 213 and then connected together, and the cantilever and the glass substrate are thereafter bonded together by an epoxy adhesive 220 containing φ8 μm nylon or glass beads.

Since beads are inserted between the cantilever and the glass substrate, a space therebetween can be maintained to be 8 μm, so that the Ga—In alloys 212 and 213 which are applied on the upper electrode and the lower electrode are not expanded excessively.

Since this method does not require a step for forming projections, unlike the methods of the first and second embodiments, the preparing cost can be further reduced.

As described above, according to the present invention, when signals of the upper and lower electrodes of piezoelectric film are to be taken out, the second electrode extracting substrate which is provided with the small communicating projections and the wiring pattern communicating with said projections is used, whereby it is possible to avoid the deterioration in the electric properties of the film which are unavoidable according to the prior art since the conventional dielectric film requires steps following the film formation. The present invention is particularly effective when a piezoelectric signal of the cantilever for the AFM with the piezoelectric film displacement sensor is to be taken out. Furthermore, the steps following the film formation out of the preparing steps of the conventional electronic elements are no longer required, thus reducing production cost. In addition, it is possible, according to the present invention, to take out the electrodes of the dielectric film in the same step so that it is also possible to take out the electrodes effectively regardless of the material of the dielectric substance.

What is claimed is:

1. A cantilever for an atomic force microscope with a piezoelectric film displacement sensor, comprising:

a first substrate member on which an upper electrode and a lower electrode of a dielectric thin film are formed;

a metal which is liquid at a normal temperature or a conductive paste formed on a part of said upper electrode and a part of said lower electrode; and a second substrate member on which a wiring pattern of an electrode extracting portion to be connected to said metal or said conductive paste.

2. A cantilever for an atomic force microscope according to claim 1, further comprising:

a cantilever provided on said first substrate member; and a piezoelectric film provided on said cantilever.

3. A cantilever for an atomic force microscope according to claim 1, wherein an adhesive for connecting said metal or said conductive paste to said electrode extracting portion is an adhesive containing glass or resin beads.

4. A cantilever for an atomic force microscope according to claim 3, wherein said metal is an alloy of gallium-indium group.

5. A method for extracting electrodes, comprising the steps of:

forming an upper electrode and a lower electrode on a dielectric thin film of a first substrate member;

forming a wiring pattern of an electrode extracting portion on a second substrate member;

coating a part of said upper electrode and a part of said lower electrode with a metal which is liquid at a normal temperature or a conductive paste; and connecting said parts to said electrode extracting portion to thereby allow said upper electrode and said lower electrode to be electrically connected to an external unit via said metal or said conductive paste and said electrode extracting portion.

6. A method according to claim 5, wherein an adhesive for connecting said metal or said conductive paste to said electrode extracting portion is an adhesive containing glass or resin beads.

7. A method according to claim 5, wherein said metal is an alloy of gallium-indium group.

* * * * *